United States Patent [19]
Läufer et al.

[11] Patent Number: 6,104,680
[45] Date of Patent: Aug. 15, 2000

[54] DEVICE FOR WRITING TO OR READING FROM OPTICAL RECORDING MEDIA

[75] Inventors: Engelbert Läufer, St. Georgen, Germany; Hirohito Takagi, Chiba, Japan

[73] Assignee: Deutsche Thomson-Brandt GmbH, Villingen-Schwenningen, Germany

[21] Appl. No.: 09/044,720

[22] Filed: Mar. 19, 1998

[30] Foreign Application Priority Data

Apr. 12, 1997 [DE] Germany .............................. 197 15 275

[51] Int. Cl.⁷ ....................................................... G11B 7/00
[52] U.S. Cl. ....................................... 369/44.27; 369/44.34
[58] Field of Search ............................... 369/44.27, 44.28, 369/44.29, 44.34, 44.35, 44.25, 44.41, 43, 54, 58

[56] References Cited

U.S. PATENT DOCUMENTS

| | | | |
|---|---|---|---|
| 5,123,002 | 6/1992 | Tateishi | 369/44.32 |
| 5,548,570 | 8/1996 | Hirajima et al. | 369/59 |
| 5,572,494 | 11/1996 | Nakane et al. | 369/44.28 |

FOREIGN PATENT DOCUMENTS

| | | |
|---|---|---|
| 3229761 | 3/1983 | Germany . |
| 3836629 | 5/1989 | Germany . |
| 2271033 | 3/1994 | United Kingdom . |

*Primary Examiner*—Muhammad Edun
*Attorney, Agent, or Firm*—Joseph S. Tripoli; Paul P. Kiel

[57] ABSTRACT

The present invention relates to a device for writing to or reading from optical recording media which have data tracks for recording or reading out information. It has a scanning means for scanning the data tracks, a detection means which emits a signal which is modulated in accordance with the information stored on the optical recording medium and a track detector, which generates a mirror signal by means of a reference value transmitter, which mirror signal indicates whether the scanning means is scanning a data track or the region between two tracks. The device is capable of forming a reliable mirror signal without a high outlay. For this purpose, the reference value transmitter is designed as an adaptive reference value transmitter to which the mirror signal is fed as input variable.

11 Claims, 3 Drawing Sheets

DEVICE FOR WRITING TO OR READING FROM OPTICAL RECORDING MEDIA

The present invention relates to a device for writing to or reading from optical recording media, which device has a track detector which generates a mirror signal indicating whether data tracks or the region between two data tracks are being scanned.

Known devices equipped for example with the IC CXA1081M, see Bernd Rodekurt: "Erfolgreicher CD-Player Service" [Successful CD Player Service], Franzis Verlag Munich, 1994, have a track detector which has means for forming an upper and a lower envelope of the modulated signal. The difference between these envelopes is formed and the difference value is compared with a reference value by means of a comparator. If the difference value lies below the reference value, then the mirror signal is set to the value "low", otherwise to the value "high". The reference value is determined from the difference value between the envelopes by means of a fixedly predetermined circuit arrangement.

The known devices have the disadvantage that determining the mirror signal requires the use of a plurality of analogue components which are affected by tolerances and therefore have to be coordinated with one another after assembly. Defect sources that occur during routine operation of the device, such as, for example, varying reflectivity of the optical recording medium to be read from or written to, the eccentricity thereof or the like, can only be compensated for to a limited extent.

The object of the present invention is to propose a device of the abovementioned type which is capable of forming a reliable mirror signal without a high outlay.

This object is achieved by means of the measure, of designing the reference value transmitter as an adaptive reference value transmitter to which the mirror signal is fed as input variable. This has the advantage that the reference value can always be optimally adapted even during routine operation. Specifically, in the event of track jumping, the mirror signal ideally has a ratio of "high" to "low", i.e. an H:L ratio, of 50:50. However, this can only be approximately complied with in the case of conventional devices which are not provided with an adaptive reference value transmitter, since the determination of the reference value is prescribed by the properties of the components used. The optical recording medium may be in the form of a disk, such as, for example, an audio CD, a DVD, a CD-ROM, a CD-R, etc., but other forms of optical recording media can advantageously be used as well, for example optical recording media in tape form. The data tracks are generally arranged concentrically or spirally on a recording medium in the form of a disk, but the use of recording media having other arrangements of adjacent tracks which are separated by an intermediate region also lies within the scope of the invention. In this case, the information can generally be realized as light/dark information, as rotation of the polarization direction or in another suitable manner. The scanning means may be a read head or a write head, a combination of read and write head or merely a tracking scanning means. The detection means generally has photodetectors, which convert optical signals into electrical signals which are used both to recover the information signal and to regulate the device, for example for the purpose of tracking.

The invention provides for the adaptive reference value transmitter to have means for forming an internal reference value, the output of which means is connected to the input of a reduction means which outputs the reference value. In this case, provision is made for the internal reference value to be logically combined with the mirror signal in a suitable manner. This has the advantage that undesired deviations of the H:L ratio in the mirror signal from the value 1 are corrected by the internal reference value being logically combined with the mirror signal, while at the same time the reduction means ensures that not every deviation of the mirror signal results in a change in the reference value. The reduction means may be, for example, a divider which reduces the internal reference value by a factor of 10, for example. The reduction may also be effected by using only the more significant digits of the internal reference value; for example, in a digital representation, the upper n bits of an internal reference value comprising m bits, where m>n.

The device according to the invention advantageously contains a single envelope detector, to whose input the modulated signal is applied and whose output is connected to a comparator unit which, on the other hand, is connected to the reference value transmitter and supplies the mirror signal. This has the advantage that it is possible to dispense with a second envelope detector, necessary according to the prior art, and a mirror signal which is largely independent of interference caused by a disk shock, for example, is nevertheless generated. With the aid of the adaptive reference value transmitter according to the invention, it is possible to dispense with the determination both of the upper and of the lower envelope and also the subsequent comparison of these two envelopes.

The invention provides for the envelope detector to have a digital filter. This filter stores its input value if the latter is greater than the value previously present in the store, otherwise the value previously present in the store is reduced and passed anew into the store. This has the advantage that a slow decay of the last peak value is achieved and that as soon as a new peak value occurs, it replaces the initial value. The value output by the digital filter thus corresponds to a smoothed upper envelope of the input signal.

The digital filter advantageously has a multiplier or an adder. This has the advantage that in this case the options for reducing the value present in the store are simple, yet effective. The reduction is effected either simply by multiplying the content of the store by a value smaller than 1 or, given the use of an adder, by the addition of a specific negative value. The latter option can be realized in a particularly simple manner in a digital filter.

The invention furthermore provides for the track detector to have a comparator unit which forms the mirror signal from a comparison of the input signal with an upper and a lower threshold value. The mirror signal is set to "low" if the input signal falls below the lower threshold value and to "high" if it exceeds the upper threshold value. This has the advantage that the mirror signal is formed digitally as a function of the input signal with a degree of hysteresis, with the result that the mirror signal does not jump back and forth between the values, "high" and "low" in the limit region. The region of hysteresis can be optimally adapted to the respective conditions of the device, of the optical recording medium or the like, for example by specifying a value by which the threshold values are permitted to deviate from a given reference value. The jumping back and forth in the limit region which is avoided in this way would have adverse effects particularly in the event of track jumping, since in this case the mirror signal is used to count the tracks and thus, under certain circumstances an excessively high number of tracks would be counted. In the simplest case, the threshold value forming means are adders and subtractors which add and, respectively, subtract the predetermined hysteresis value from the reference value. In this case, the predetermined value can be adapted to the respective conditions of the device or of the optical recording medium. The reference value may originate from a reference table or, advantageously, be determined adaptively. The signal forming means forms the mirror signal, whose value is set to "L" if the input signal exceeds the upper threshold value and whose value is set to "H" if the input signal falls below the lower threshold value and whose value is taken over and changed if none of these conditions applies. A simple option for realizing a signal forming means of this type consists in the use of an RS flip-flop.

According to the invention, the adaptive reference value transmitter has a digital low-pass filter. This has the advantage that DC voltage components and low-frequency components are integrated up and, consequently, a changed reference value is evident. This reference value then alters the L:H relation until a 1:1 ratio is reached. DC voltage components result in a non-uniform distribution of the L and H components of the mirror signal, which, however, ideally has a ratio of L:H=1 in the event of track jumping, since the tracks and the interspaces have the same width.

The invention furthermore provides for the modulated signal already to be fed to an analogue-to-digital converter which only digitizes a restricted range of values. This may be, for example, the range between 70% and 100% of the maximum signal. This has the advantage that only that range of the signal amplitude in which the information to be read is contained is subjected to further processing. Values lying outside this range are generally caused by defects or are impaired to such a great extent that they cannot particularly be used further and can therefore be left out of consideration. Since the analogue-to-digital converter only has to cover a smaller range of input values, it can supply output values of higher accuracy given the same complexity, or can be constructed more simply with the accuracy remaining the same.

According to the invention, a defect detector is connected to the output of the analogue-to-digital converter, which has the advantage that this detector can be of digital design without requiring an additional analogue-to-digital converter.

It is particularly advantageous to design the defect detector as a binary counter, since it is then possible to generate a defect signal by means of simply constructed standard components. In this case, the modulated signal's property of never being higher than 50% of the maximum value over a relatively long period of time in the normal case is utilized. A defect is present otherwise. In this case, a binary counter counts the clock signal, is set to 0 by the most significant bit of the digitized, modulated signal and outputs a defect message when a predeterminable number of clock cycles have elapsed without it having been set to 0 again.

The method, specified in the method claim, for changing an operating parameter "reference value" in particular of an inventive device for writing to or reading from optical recording media is advantageously employed in the above-mentioned devices. This method makes it possible to dispense with settings of standard values in the production of corresponding devices, since the reference value can be adaptively matched to changed conditions by means of the method according to the invention.

Further advantages of the present invention can be found in the following description of an exemplary embodiment, but the invention is not restricted to the exemplary embodiment. In the figures.

Figure 1:
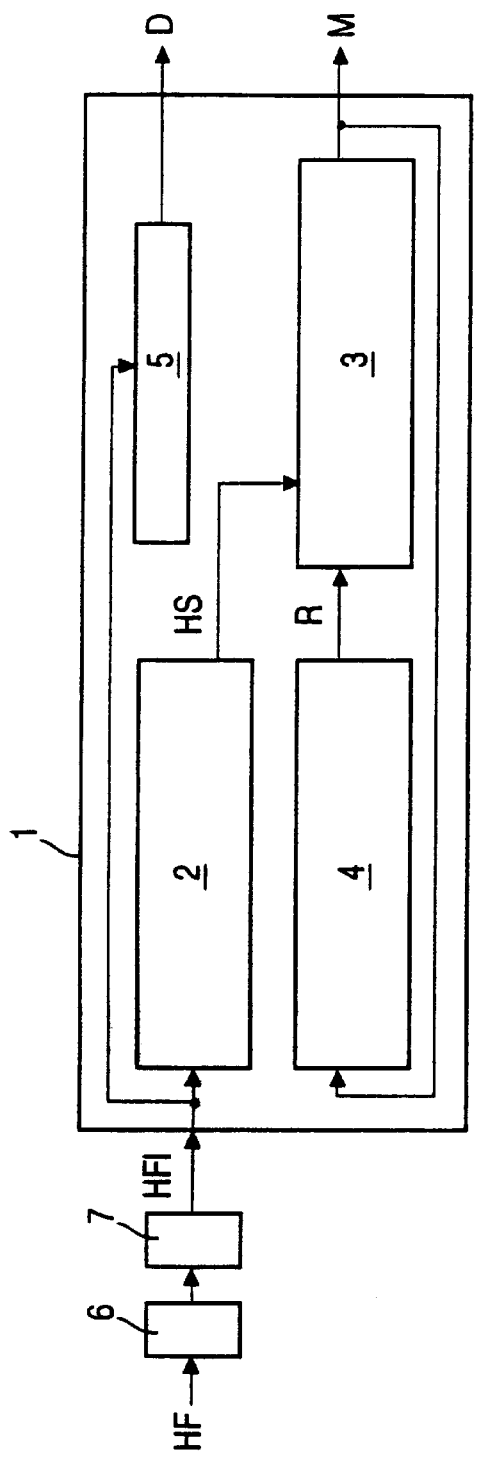
FIG. 1 shows a block diagram of a device according to the invention.

FIG. 1 illustrates a block diagram of a device according to the invention. In this case, an analogue signal HF, which arrives from the detection means of the device and is modulated in accordance with the information stored on the optical recording medium, is fed to a track detector 1, which emits the mirror signal M and a defect signal D. The track detector 1 has an envelope detector 2, whose output signal, the envelope signal HS, is fed to a comparator unit 3, whose output signal is the mirror signal M. The other input of the comparator unit 3 is connected to the output of an adaptive reference value transmitter 4, to whose input the mirror signal M is applied. The track detector 1 is additionally provided with a defect detector 5, which generates the defect signal D from the input signal. In the exemplary embodiment, the track detector 1 operates on a digital basis, for which reason the analogue, modulated signal HF is first of all digitized by means of an analogue-to-digital converter 6 and inverted by means of an invertor 7. The invertor 7 may also be already assigned to the track detector 1, but, on the other hand, it is likewise possible to interchange the order of analogue-to-digital converter 6 and invertor 7, the invertor being an analogue component in this case. Once the modulated signal HF has been digitized and inverted, it passes as signal HFI to the input of the track detector 1. From this, the envelope detector 2 forms an upper envelope which, in the comparator unit 3, is compared with a reference value R output by the reference value transmitter 4. The comparator unit 3 generates the mirror signal M, which, on the one hand, is output and, on the other hand, is used by the adaptive reference value transmitter 4 to adapt the reference value R if appropriate.

Figure 2:
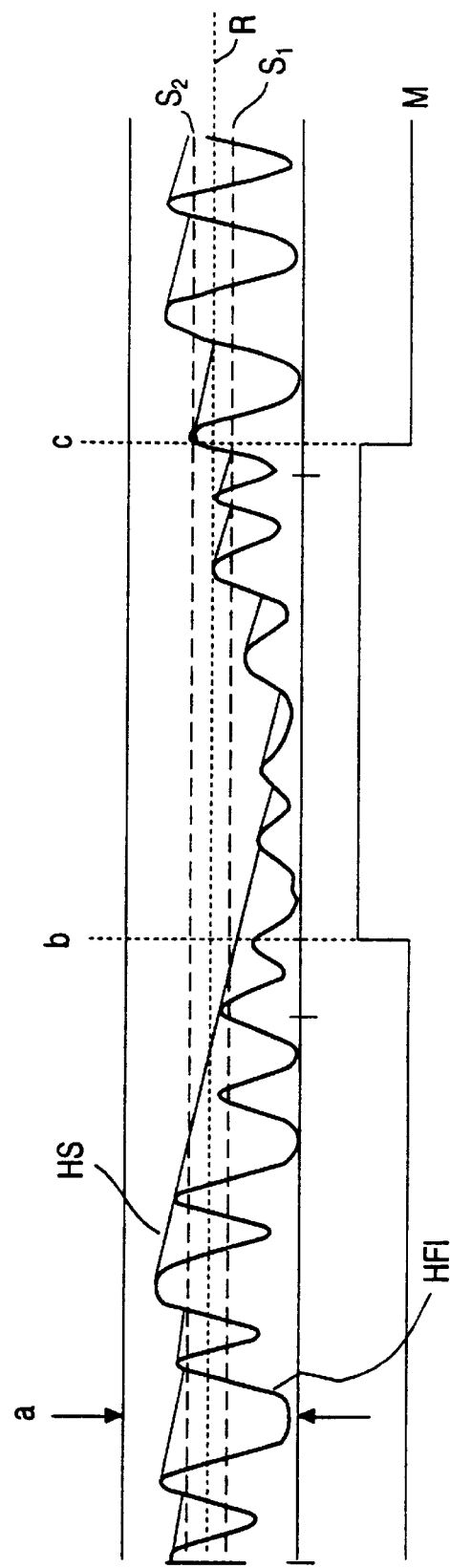
FIG. 2 shows an illustration of a number of important signals which occur in a device according to the invention.

FIG. 2 illustrates a number of important signals which occur in a device according to the invention. The digitized and inverted modulated signal HFI, which lies within the range of values a of the analogue-to-digital converter 6, is evident. All values lying above or below this range of values a assume either the upper or the lower limit value of the range of values a. The range of values a is chosen such that it contains the practically occurring values. An envelope signal HS is generated from the inverted signal HFI by means of the envelope detector 2. The signal HS assumes the value of the signal HFI if the latter value is greater than the preceding value of the signal HS, otherwise the signal HS assumes a falling characteristic. Exemplary embodiments of the envelope detector 2 are described below with reference to FIGS. 3 and 4. The envelope signal HS is compared with a reference value R in the comparator unit 3. If the envelope signal HS falls below a lower threshold value S1, then the mirror signal M is set to a level "high", and if the envelope signal HS subsequently exceeds an upper threshold value S2, then the mirror signal M is set to "low". Corresponding transitions occur in FIG. 2 at the points identified by b and c, respectively. As described further below, the upper threshold value S2 and the lower threshold value S1 are formed as a function of the reference value R. The latter, in turn, is formed in the adaptive reference value transmitter 4 in such a way that the temporal ratio of high to low phase of the mirror signal M in the event of track jumping assumes the value 1.

Figure 3:
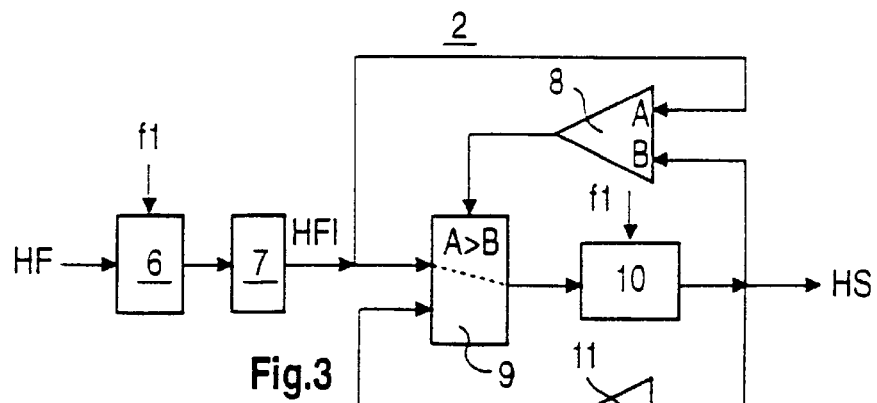
FIG. 3 shows a schematic illustration of an envelope detector in accordance with a first embodiment.

FIG. 3 shows a first embodiment of the envelope detector 2. The input signal HFI thereof is the modulated signal HF which is digitized by means of the analogue-to-digital converter 6 and inverted by means of the invertor 7. In this case, the analogue-to-digital converter 6 operates at a clock frequency f1. In a comparator 8, the inverted signal HFI is compared with the envelope signal HS, the output signal of the envelope detector 2. The output signal of the comparator 8 controls a 2:1 selector 9. That input of the selector 9 to which the signal HFI is applied is connected to the output of the selector 9 when the comparator 8 outputs a signal indicating that the signal HFI is greater than the signal HS. Otherwise, the other, the second input of the selector 9 is connected to the output thereof. The output of the selector 9 is connected to a register 10, which is likewise clocked at the frequency f1 and whose output the envelope signal HS can be picked off. The envelope signal HS is fed to the input of a multiplier 11, whose multiplication coefficient is chosen such that it is less than 1. The output of the multiplier 11 is connected to the second input of the selector 9. The method of operation of the envelope detector 2 illustrated in FIG. 3 is as follows: as long as the inverted signal HFI is greater than the envelope signal HS, the value of the inverted signal HFI is written to the register 10 and output as envelope signal HS in the next clock cycle. Otherwise, the value output by the multiplier 11 is written to the register 10 and output as envelope signal HS in the next clock cycle. Since the coefficient of the multiplier is less than 1, the value of the envelope signal HS decreases with time as long as the condition HFI<HS holds true.

Figure 4:
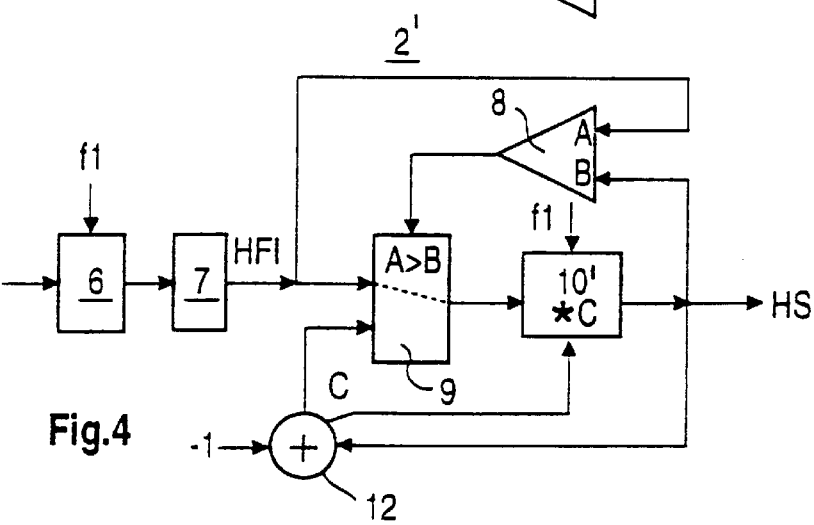
FIG. 4 shows a schematic illustration of an envelope detector in accordance with a second embodiment.

FIG. 4 illustrates a simplified envelope detector 2'. For the most part, it corresponds to the envelope detector 2 described with reference to FIG. 3, so that only the components and functions which are different in comparison therewith are described here. Instead of the multiplier 11, a full adder 12 is provided. Applied to the inputs thereof are, on the one hand, the envelope signal HS and, on the other hand, a fixed, predeterminable value, in this case −1. The output of the full adder 12 is connected to the second input of the selector 9, and the carry C of the full adder 12 is fed to a register 10'. The contents of the register 10' is erased if the carry C=0 and remains unchanged if the carry C=1. Since the full adder 12 receives the constant −1, situated at the input, in two's complement representation, the carry C is 0 only when the envelope signal HS already has the value 0. The form of the envelope detector 2' that has been described with reference to FIG. 4 is portrayed more simply on a digital basis than that described with reference to FIG. 3, but supplies a suitable envelope signal HS nevertheless.

Figure 5:
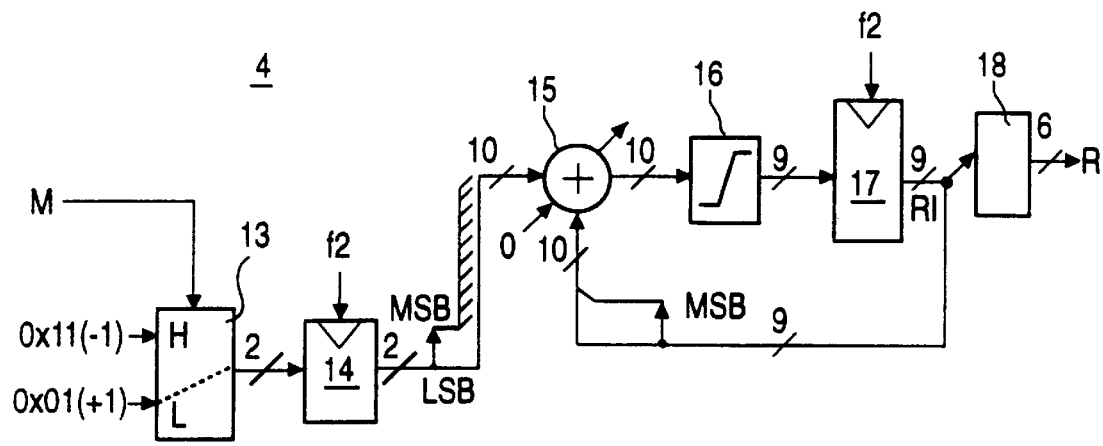
FIG. 5 shows a schematic illustration of an adaptive reference value transmitter.
Figure 6:
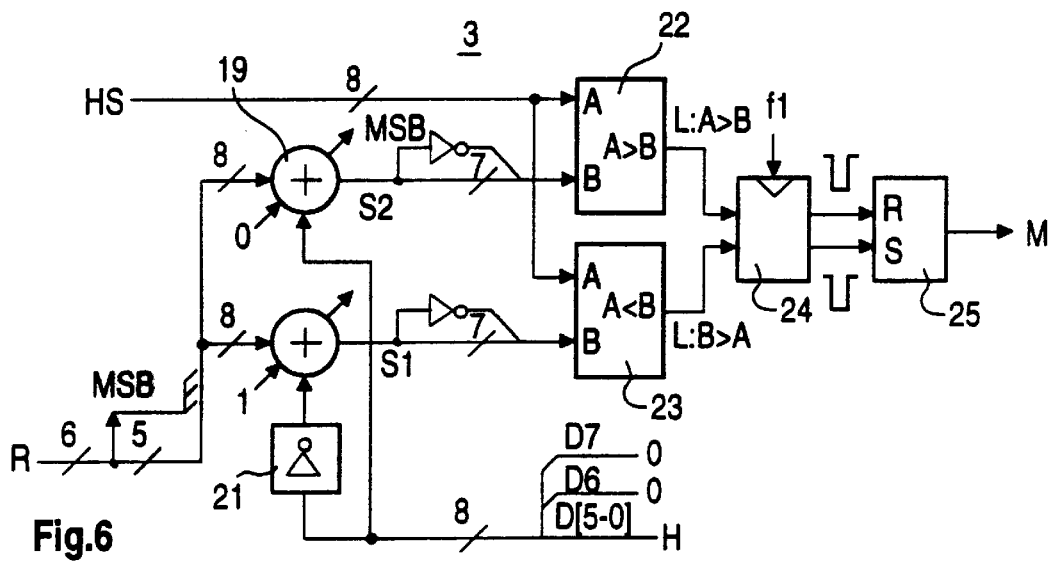
FIG. 6 shows a schematic illustration of a comparator unit according to the invention.

FIG. 5 shows a schematic illustration of an adaptive reference value transmitter 4. In this case, data lines which transmit more than one bit in parallel are indicated in FIGS. 5 and 6 by a stroke and the detail of the number of bits transmitted in parallel. The mirror signal M is fed to a 2:1 selector 13, which emits a signal −1 if the mirror signal has the level "high" and a signal +1 if the mirror signal has the level "low". The output signal of the selector 13 consists of two bits; consequently, in two's complement representation, the value −1 corresponds to the binary number 11D and the value +1 to the binary number 01D. The output of the selector 13 is connected to a digital flip-flop 14, which is clocked at a frequency f2. The output of the digital flip-flop 14 is connected to the input of an adder 15, which processes values in 10-bit representation. Therefore, there is interposed between the digital flip-flop 14 and the adder 15 a sign extension in which the more significant bit MSB of the 2-bit representation is transferred to the nine more significant bits of the 10-bit representation, while the least significant bit LSB of the 2-bit representation is also taken over as LSB for the 10-bit representation. The carry input of the adder 15 is always set to the value 0, while the carry output has no role to play. The output of the adder 15 is connected to a limiter 16.

The limiter 16 limits the value in 10-bit representation present at its input to a value in 9-bit representation. Since the values in 9-bit two's complement representation can range from −512 to +511 in decimal representation, input values lying outside this range are output as −512 or +511 by the limiter 16.

The output of the limiter 16 is connected to the input of a digital flip-flop 17, which is clocked as the frequency f2. The internal reference value RI is present at the output of the digital flip-flop 17. The output of the digital flip-flop 17 is connected, on the one hand, via a sign extension to 10 bits, to the second input of the adder 15 and, on the other hand, to the input of a reduction means 18. The latter outputs only the six more significant bits of the internal reference value RI as reference value R. The internal reference value RI is thus increased or reduced by the value 1 in the adder 15 as a function of the value of mirror signal M, limited to a maximum value in the limiter and output as current internal reference value RI by the digital flip-flop 17 in the next clock cycle. Since the reference value R merely comprises the six more significant bits of the internal reference value RI, slight fluctuations in the value RI do not lead to a fluctuation of the reference value R. The reference value R is adapted if the H:L ratio in the mirror signal M deviates from the value 1 when averaged over a relatively long period of time. In the exemplary embodiment, the reference value transmitter 4 is specified as a simple low-pass filter, and the reduction to 6 bits if effected owing to the gain factor ⅛ of this low-pass filter.

The clock frequency f1=8.4672 MHz is the frequency at which the HF signal, i.e. the data signal, is processed. Since the mirror signal M has a maximum frequency in the region of about 20 MHz, it is practical to choose the frequency that is used for the processing of the mirror signal M to be less than f1 in order to keep the costs of the components, in particular of the digital filter, low. In the exemplary embodiment, a frequency f2=44.1 kHz has therefore been chosen.

The reference value R is adapted by means of the adaptive reference value transmitter 4 in such a way that a 50% duty cycle in the mirror signal M, i.e. a ratio H:L=1, is achieved. Since the track width and the width of the region between two tracks of the optical recording medium are identical or at least virtually identical, the mirror signal M ideally has a characteristic of this type during a track jumping operation. If this is not the case, then either the phases in which the mirror signal is "high" become longer than those in which it is "low", or vice versa. The adaptive reference value transmitter 4 thus has a first-order low-pass filter which integrates DC voltage components and low-frequency components. Low-frequency components can be caused for example by vertical tilting of the recording medium, by changes in the intensity of the light reflected from the recording medium, or by the eccentricity of the recording medium.

FIG. 6 illustrates a comparator unit 3 according to the invention. The reference value R is extended form 6 to 8 bits by the three leading bits of the 8-bit value assuming the value of the most significant bit of the 6-bit value. The extended value of the reference value R is fed to a first adder 19 and a second adder 20. A hysteresis value H, which determines the separation of two threshold values S1, S2, determined from the reference value R, is specified as a 6-bit digital value in the exemplary embodiment. It is extended to an 8-bit value by supplementation of the two most significant bits, which are both set to 0. The hysteresis value H is then fed to the second input of the first adder 19 and, via an 8-bit invertor 21, to the second input of the second adder 20. The value 0 is applied to the carry input of the first adder 19, while the value 1 is applied to the carry input of the second adder 20. Thus, the upper threshold value S2 is output at the output of the first adder 19 and the lower threshold value S1 is output at the output of the second adder 20.

The MSB of the threshold values S1 and S2 is inverted before it is passed to the respective input B of the comparators 23 and 22, in order to get from the 2's complement representation (−128 to +127) to the offset binary number representation (0 to 255).

The upper threshold value S2 is passed to the second input of a first comparator 22, and the lower threshold value S1 is passed to the second input of a second comparator 23. The envelope signal HS is applied to the first inputs of the comparators 22 and 23. The first comparator 22 emits a signal "low" if the envelope signal HS is greater than the upper threshold value S2. The second comparator 23 emits a signal "low" if the envelope signal HS is less than the lower threshold value S1. The outputs of the comparators 22 and 23 are connected to a 2-bit digital flip-flop 24, which is clocked at the clock frequency f1. The outputs of the flip-flop 24 are connected to the inputs of an RS flip-flop 25. The RS flip-flop 25 operates "active low", i.e. if the flip-flop 24 emits a "low" signal to the set input, indicated by S, of the RS flip-flop, then the output thereof is set to 1. If, on the other hand, a "low" signal is applied to the reset input, indicated by "R", of the RS flip-flop 25, then the output thereof is set to 0. In all other cases, the last valid output value is maintained. The mirror signal M is thus present at the output of the RS flip-flop 25.

Figure 7:
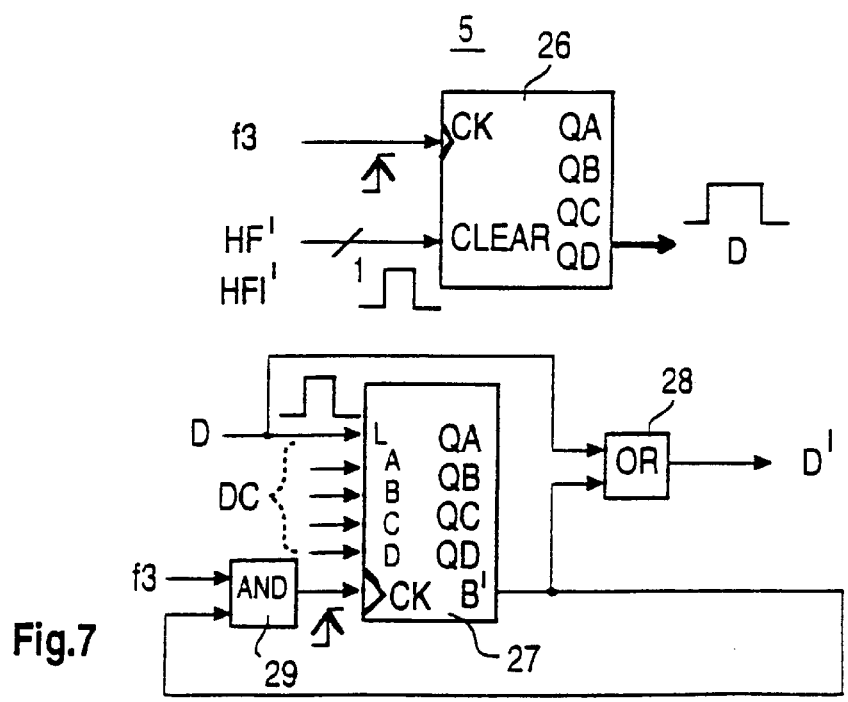
FIG. 7 shows a schematic illustration of a defect detector according to the invention.

FIG. 7 shows a schematic illustration of a defect detector 5 according to the invention. For this, a binary counter 26, which operates with four bits, is provided in the exemplary embodiment. A clock frequency f3 is applied to the clock input CK, which frequency is f3=88.2 kHz in the exemplary embodiment. Upon each rising edge of the clock signal applied to the clock input CK, the counter is increased by one bit. In this case, QA represents the least significant bit and QD the most significant bit. The most significant bit of the digitized, high-frequency input signal HF, which is indicated as HF' here, is applied to the reset input CLEAR of the counter 26. The counter 26 is reset to zero when the input signal HF' is greater than the 50% value of the range to be digitized. Only the QD output of the binary counter 26, in other words the most significant bit, emits an output signal, the defect signal D. This means that a defect signal D=1 is emitted only when the value of the signal HF' has been less than 50% of the maximum value in at least 7 successive clock cycles at the clock frequency f3. The structure of the information recorded on the recording medium is chosen such that a corresponding value above 50% normally occurs significantly more frequently, so that lower values in 7 successive clock cycles are a relatively certain indication of the fact that a defect is present. Depending on external parameters, for example the chosen digitization range in which the analogue-to-digital converter 6 digitizes the analogue input signal HF, it may be advantageous to vary the clock frequency f3 and/or the number of bits of the counter 26 from the values specified in the exemplary embodiment, in order to achieve a suitable defect criterion. It is likewise possible to pick off the defect signal at the output QC or another output of the counter 26, if appropriate also with an AND or OR combination of two or more of the outputs of the counter 26.

The lower part of FIG. 7 illustrates how the defect signal D is extended in a simple manner so that it has a desired minimum temporal length. For this purpose, the defect signal D is connected, on the one hand, to a 4-bit down-counter 27 and also to the "load" input of an OR gate 28. If the value 1 is present at the "load" input L, then a predetermined defect constant DC is loaded into the down-counter 27. As long as at least one of the registers A, B, C, D of the down-counter 27 is not 0, a value 1 is also present at the "borrow" output B'. The output B' is connected to one input of an AND gate 29, to whose other input the clock frequency f3 is applied. The output of the AND gate 29 is applied to the clock input CK of the down-counter 27. As long as the down-counter has a number other than 0 in its registers, a counting-down operation is triggered by each clock cycle f3. If the counter 27 has reached the value 0, then the "borrow" output B' also assumes the value 0, and the AND gate 29 is inhibited. The OR gate 28 emits an extended defect signal D' having the value D'=1 when the defect signal D assumes the value D=1 and subsequently as long as the "borrow" output B' of the down-counter 27 is not 0. The extended defect signal D' thus assumes the value 1 during a minimum period of time which is predetermined by the defect constant DC, on the one hand, and the clock signal f3, on the other hand. The defect signal D or the extended defect signal D' are emitted when no or insufficient modulation occurs in the signal HF for a specific period of time.

In a device according to the invention, both the speed and the accuracy of track jumping are increased since a very exact mirror signal is available, which signal serves, inter alia, for counting the tracks crossed.

What is claimed is:

1. A device for writing to or reading from optical recording media, which have data tracks for recording or reading out information, comprising a scanning means for scanning the data tracks, having a detection means which emits a signal which is modulated in accordance with the information stored on the optical recording medium, and having a track detector, which generates a mirror signal by means of a reference value transmitter, which mirror signal indicates whether the scanning means is scanning a data track, wherein the reference value transmitter is an adaptive reference value transmitter that generates a variable reference value in response to the mirror signal.

2. The device according to claim 1, wherein the adaptive reference value transmitter contains an adding means, to whose inputs the mirror signal and an internal reference value are applied and whose output is connected to the input of a limiter, at whose output the internal reference value is output and which is connected to an input of a reduction means, at whose output the reference value is output.

3. The device according to claim 1, wherein said device includes a single envelope detector, to whose input the modulated signal is applied and whose output is connected to a comparator unit, which, on the other hand, is connected to the reference value transmitter and at whose output the mirror signal can be picked off.

4. The device according to claim 3, wherein the envelope detector has a digital filter.

5. The device according to claim 4, wherein the digital filter has a multiplier or an adder.

6. The device according to claim 1, wherein the track detector has a comparator unit, which has threshold value forming means for forming an upper and a lower threshold value from a given reference value, a first and a second comparator, to whose first input a respective input signal of the comparator unit is applied and to whose second input the upper and the lower threshold value, respectively, are applied, and a signal forming means, whose inputs are connected to the outputs of the first and second comparators, and whose output corresponds to the mirror signal.

7. The device according to claim 1, wherein the adaptive reference value transmitter has a digital low-pass filter.

8. The device according to claim 1, wherein the modulated signal is fed to an analogue-to-digital converter, which only digitizes a restricted range of values of the modulated signal, and whose output is connected to the track detector.

9. The device according to claim 8, wherein a defect detector is connected to the output of the analogue-to-digital convertor.

10. The device according to claim 9, wherein the defect detector is a binary counter.

11. A method for changing an operating parameter, as reference value, of a device for writing to or reading from optical recording media, comprising the following steps:

subjecting an input signal to analogue-to-digital conversion and inverting the converted signal;

storing the digital value in a store if it is greater than a value previously contained in the store, otherwise the value usually present in the store is reduced and stored anew in the store;

comparing the value present in the store with an upper and a lower threshold value; if it exceeds the upper threshold value, then a mirror signal is set to a first value; if it falls below the lower threshold value, then the mirror signal is set to a second value; if none of the above-mentioned conditions applies, then the mirror signal remains unchanged in comparison with the previous clock cycle;

increasing an existing internal reference value by at least one bit if the mirror signal resumes a first value, and reducing the internal reference value by at least one bit if the mirror signal assumes a second value;

limiting the internal reference value so that its magnitude does not exceed a predetermined maximum value; and outputting a predetermined number of the most significant bits of the internal reference value as a changed operating parameter reference value.

* * * * *